United States Patent [19]
Booker

[11] 3,754,118
[45] Aug. 21, 1973

[54] FLEXIBLE IMMERSION HEATER

[76] Inventor: Aylwin Reed Booker, 4887 Palo Dr., Tarzana, Calif. 91356

[22] Filed: Feb. 12, 1971

[21] Appl. No.: 114,776

[52] U.S. Cl. ................... 219/523, 138/89, 219/306, 219/331, 219/336, 219/528, 219/549, 338/214
[51] Int. Cl. .......................... H05b 3/54, H05b 1/02
[58] Field of Search ... 219/296–299, 302–309, 313, 316, 318, 335–338, 520–523, 528, 538, 544, 546, 548, 549, 550, 553, 334; 338/210–214, 226, 268, 273, 274; 285/239; 138/89

[56] References Cited
UNITED STATES PATENTS

| | | | |
|---|---|---|---|
| 2,784,292 | 3/1957 | Haloski | 219/534 |
| 1,086,646 | 2/1914 | Christian | 219/313 |
| 1,996,855 | 4/1935 | Cheswright | 285/239 |
| 2,833,909 | 5/1958 | Levey | 219/306 X |
| 2,883,513 | 4/1959 | Schnabel | 219/528 |
| 2,888,546 | 5/1959 | Kinney | 219/523 X |
| 3,286,078 | 11/1966 | Hynes | 219/549 X |
| 3,578,027 | 5/1971 | Zopfi | 138/89 |

FOREIGN PATENTS OR APPLICATIONS

| | | | |
|---|---|---|---|
| 970,583 | 6/1950 | France | 285/239 X |
| 1,237,238 | 3/1967 | Germany | 338/214 |
| 534,451 | 3/1941 | Great Britain | 219/313 |
| 990,187 | 4/1965 | Great Britain | 219/549 |
| 1,167,343 | 10/1969 | Great Britain | 219/549 |

*Primary Examiner*—A. Bartis
*Attorney*—Harris, Kern, Wallen & Tinsley

[57] ABSTRACT

A flexible immersion heater assembly which permits fabrication of any desired length heater in the field includes a fluid impermeable flexible tube of non-metallic resilient material containing a section of flexible insulated electrical resistance wire. One end of the tube is telescoped over a frustoconically ribbed nipple on a hose fitting. The other end of the tube is suitably closed by a ribbed plug or a bonded pinch seal. Electrical leads to the resistance wire entend through the hose fitting and sealant means are provided for sealing the leads relative to the fitting. A thermostatic switch or a thermocouple are provided for controlling the heater in response to temperature changes. The heater assembly is adapted to be inserted in pipes, conduits and tanks.

2 Claims, 10 Drawing Figures

Patented Aug. 21, 1973
3,754,118
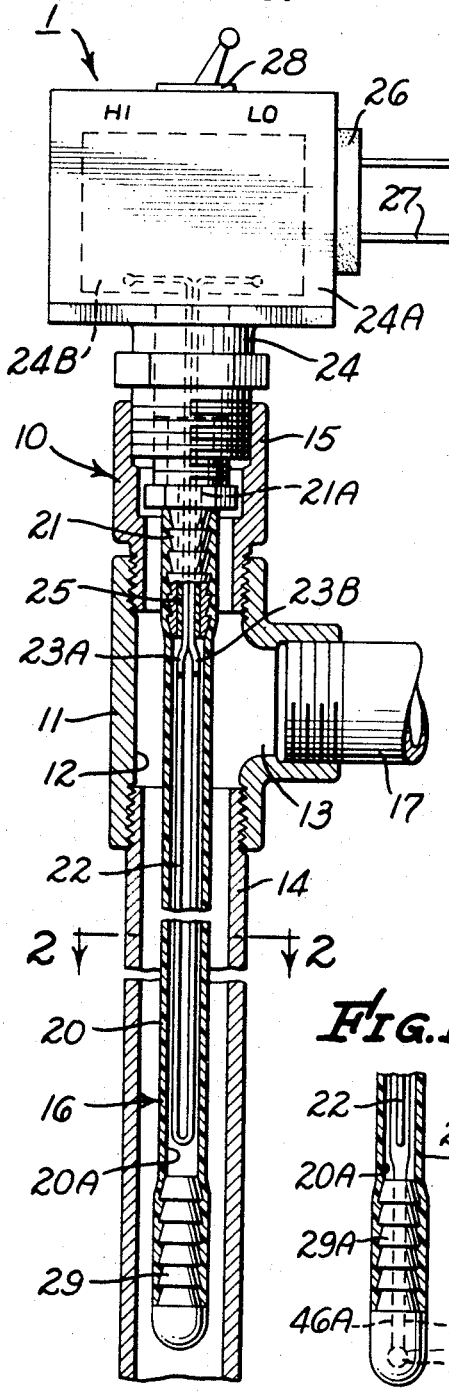
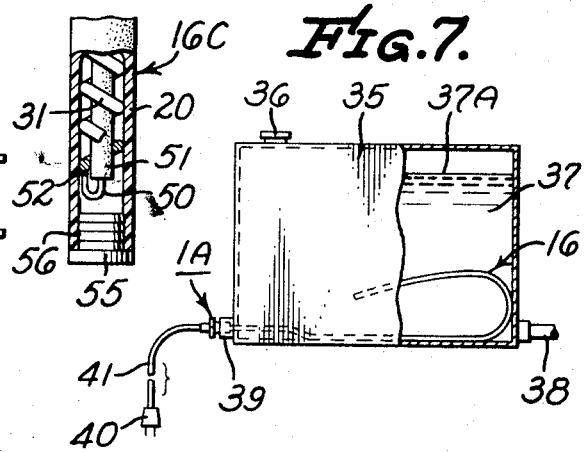
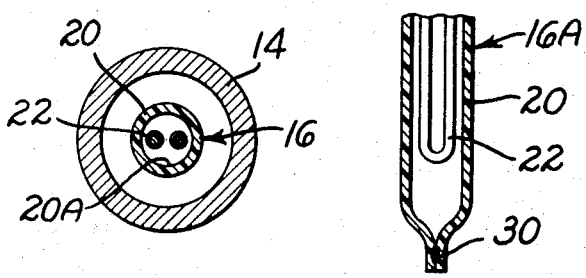
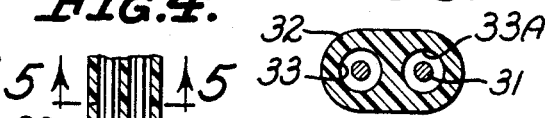
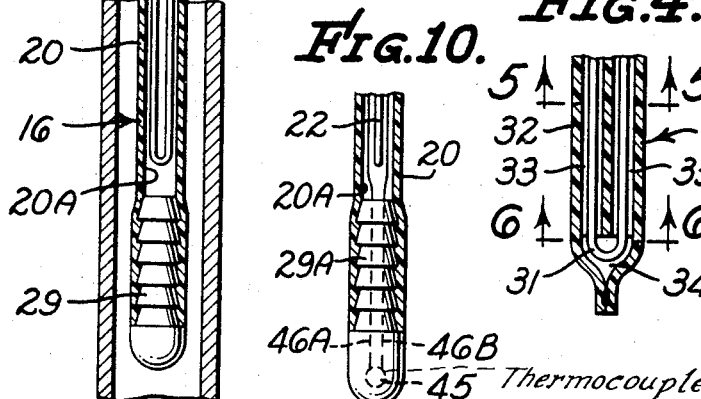
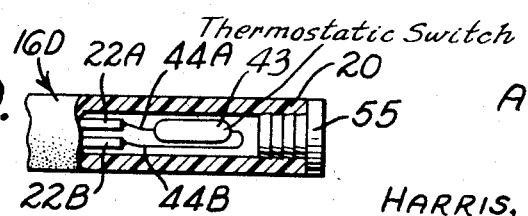
INVENTOR.
AYLWIN REED BOOKER
BY HIS ATTORNEYS.
HARRIS, KIECH, RUSSELL & KERN

FLEXIBLE IMMERSION HEATER

BACKGROUND OF THE INVENTION

The present invention relates to immersion heaters. More particularly, the present invention relates to an immersion heater having a flexible heater element which can be inserted in pipes, conduits and tanks.

Immersion heaters per se are relatively old in the art and consist of resistance elements sheathed with insulation and a metal or glass casing. Such immersion heaters are quite successful and are used extensively; however, they have limited utility. For example, such heaters cannot be inserted into circuitous or serpentine conduit systems because of the inflexibility of the outer glass or metal sheath. Further, heaters having glass sheaths are relatively fragile and are rendered inoperative when the glass sheath is fractured or broken. Furthermore, such immersion heaters cannot be constructed on the job site; that is, an immersion heater of certain dimensions cannot be constructed at the job site because their manufacture requires special equipment and special operations that are not easily performed outside factory conditions. The manufacture of immersion heaters off the job site frequently leads to problems such as when the given dimensions for the specified heater are not true and the manufactured immersion heater is either too large or too small for its particular intended purpose. A further disadvantage of the conventional immersion heater arises from the fact that they are of complex construction made of relatively expensive materials and require sophisticated machinery for their manufacture; these are some of the factors which have made conventional immersion heaters relatively expensive.

Many attempts have been made to overcome the disadvantages of the conventional immersion heaters with the development of other types of heaters. The most typical examples of such attempts are the strip, tape and pad heaters. These heaters are made of electrical resistance wire sheathed in an asbestos or glass fiber mesh cloth. These heaters can be used to cover complex shapes or circuitous and serpentine conduits. Unfortunately these types of heaters cannot be immersed and thus are relatively inefficient and expensive to operate since over half of the heat energy is lost to the surrounding air. A further disadvantage of these types of heaters arises from the fact that they can be easily damaged and shorted out by mechanical abrasion, cuts from sharp edges or hard blows. These heaters are also made of expensive materials; they are expensive to manufacture; and they usually do not offer any cost saving over the conventional immersion heater.

SUMMARY OF THE INVENTION

The flexible immersion heater of the present invention, comprises in combination a section of flexible, fluid impermeable tubing; a section of electrical resistance wire lying within said tubing along the length thereof; a fitting having a central bore which is attached to one end of the tubing; two sections of electrical wire connected to the opposite ends of said resistance wire and extending through the central bore of said hose fitting; and means of closing off the opposite end of said tubing.

It is an object of the present invention to provide an immersion heater having a flexible immersion heater element which can be employed in conduits, pipes and tanks. More particularly, it is an object to provide an immersion heater which can be employed in circuitous or serpentine conduits, pipes and tanks.

Another object of the present invention is to provide an immersion heater which has a flexible immersion heater element which can be easily inserted into conduits, pipes and tanks. More particularly, it is an object to provide an immersion heater having a flexible immersion heater element which can be inserted into bending, twisting, serpentine or circuitous conduits, pipes or tanks.

A further object of the present invention is to provide an immersion heater which can be readily constructed and installed on the job site. More particularly, it is an object to provide an immersion heater which has a heater element prepared from a minimum of parts, which is easy to maintain and which can be made to given dimensions for a given job on the job site.

Another and further object of the present invention is to provide an immersion heater which is of simple construction, made of readily available and inexpensive materials and which can be made in a minimum number of man hours with relatively inexpensive tools.

An important object of the invention is to provide an immersion heater wherein the fitting through which the electrical leads extend is an ordinary hose nipple having frusto-conical annular ribs, the tube containing the resistane wire being telescoped over the hose nipple at one end. With this construction, an immersion heater of any desired length may be made readily in the field.

DESCRIPTION OF THE DRAWINGS

FIG. 1 is a cross-sectional view of a flexible immersion heater in a conduit system and incorporating the presently preferred embodiment of the invention;

FIG. 2 is a cross-sectional view of the flexible immersion heater element of FIG. 1 taken along line 2—2;

FIG. 3 is a fragmentary cross-sectional view of the outer end of a flexible immersion heater element incorporating an alternative embodiment of the invention;

FIG. 4 is a fragmentary cross-sectional view of the outer end of a flexible immersin heater element incorporating another embodiment of the present invention;

FIG. 5 is a cross-sectional view of the flexible immersion heater element of FIG. 4 taken along line 5—5;

FIG. 6 is a cross-sectional view of the flexible immersion heater element of FIG. 4 taken along line 6—6;

FIG. 7 is a fragmentary sectional view illustrating the installation of the flexible immersion heater of the present invention in a fluid containing tank;

FIG. 8 is a fragmentary cross-sectional view of the outer end of a flexible immersion heater element incorporating another embodiment of the present invention;

FIG. 9 is a fragmentary cross-sectional view of the outer end of a flexible immersion heater element incorporating a further embodiment of the present invention; and FIG. 10 is a fragmentary cross-sectional view of the outer end of a flexible immersion heater element incorporating still another embodiment of the present invention.

DETAILED DESCRIPTION OF THE INVENTION

Referring to FIG. 1, an immersion heater 1 is mounted in a conduit system 10. The conduit system includes a threaded T-fitting 11, having a central bore 12 and a side bore 13 connecting with the central bore.

A threaded male first conduit 14 is attached to the first end of the T-fitting in axial alignment with the central bore. A threaded female-male reducing fitting 15 is attached to the second end of the T-fitting in axial alignment with the central bore. The immersion heater 1 is threaded into the reducing fitting 15 with flexible immersion heater element 16 extending through fitting 15, the T-fitting and the first conduit. A second conduit 17 is attached to the side bore of the T-fitting in axial alignment with the side bore 13. The first and second conduits are an integral part of a fluid system (not shown).

The flexible immersion heater element 16 includes a fluid impermeable flexible tube 20 having a central bore 20A. The upper end of the tube is attached to a threaded male tube fitting 21, which is an ordinary hose nipple having frusto-conical annular ribs. An insulated, flexible electrical resistance wire 22, folded upon itself, is situated within the tube's bore 20A and runs the length thereof (see FIG. 2). The respective ends of the resistance wire are connected to two insulated electrical leads 23A and 23B. The electrical leads pass through the central orifice 21A of the tube fitting 21, through a male threaded frame element 24 into a circuit box 24A wherein they are connected to an electrical regulating device which is schematically shown as Box 24B. The electrical regulating device can be any device which regulates the heat output of the immersion heater. Typical regulating devices include variable transformers, solid state voltage regulating devices and rheostats. The frame element 24 is attached to the reducing fitting 15 and a male plug 26 is mounted on the side of the electrical box. The male electrical prongs 27 of the plug are electrically connected to device 24B. A voltage control switch 28 is mounted on the top of the circuit box and is electrically connected to the device 24B. Optionally the electrical leads 23A and 23B can be eliminated and the free ends of the resistance wire 22 can be connected directly to the device 24B.

The lower end of the tube 20 is closed and sealed off with a male plug fitting 29, which is externally similar to an ordinary hose nipple and has frusto-conical annular ribs. The space between the resistor wire 22 and the inner wall of the tube is filled with air or an inert gas such as nitrogen, carbon dioxide, helium or the like. Optionally, the tube can be filled with a liquid or a flexible solid filler such as ethylene glycol, liquid latex, or rubber foam. Preferably the filler is a good electrical insulator and a heat conductor. The electrical leads 23A and 23B are insulated and are optionally sealed in the center orifice 21A with a sealant 25. Typical sealants that can be employed in the present invention include refractory materials such as glasses or ceramics, or resilient sealants such as rubber, synthetic rubber, silicon or acrylic sealants.

Referring to FIG. 3, in an alternative embodiment of the present invention, the lower end of the flexible immersion heater element 16A is closed and sealed off with a heat seal or an adhesive seal 30. This type of seal is readily produced by pinching off the end of the tube and welding the opposing inner walls of the tube together with a heat weld or an adhesive weld.

Referring to FIG. 4, in another embodiment of the present invention, a flexible immersion heater element 16B has a liquid impermeable tube 32 which has two parallel bores 33 and 33A (see FIG. 5). Both ends of the tube 32 have chambers 34 which communicate with both bores. The chamber at the upper end of tube 32 is inserted into a tube fitting such as the tube fitting 21 illustrated in FIG. 1. The chamber at the lower end of tube 32 is closed off by a heat seal or an adhesive seal. Alternatively the lower end of the tube can be sealed off with a male tube plug fitting, such as fitting 29 (FIG. 1). A section of uninsulated flexible resistance wire 31 runs the length of one bore of tube 32, passes through the lower chamber 34 (see FIG. 6) and runs the length of the other bore 33A of the tube (see FIG. 5). The free ends of the resistance wire are connected to electrical leads, such as electrical leads 23A and 23B illustrated in FIG. 1, in the chamber 34 at the upper end of the tube.

The use of the present resistance heater 1A in a tank is illustrated in FIG. 7. The tank 35 has an inlet 36, and an outlet conduit 38. The tank is partially filled with the liquid 37 to level 37A. The immersion heater 1A is connected to the tank via a fluid tight fitting 39. The flexible immersion element 16 of the heater, is inserted into the tank below the level of the liquid. Electrical energy is supplied to the immersion heater by means of male plug 40 and electrical cord 41 which, in this embodiment is connected directly to the resistance wire of the heater.

Referring to FIG. 8, in this illustrated embodiment of the present heater, the flexible immersion heater element 16C includes the tubing 20 and the uninsulated resistance wire 31 which is wound around a wire electrical lead 50 in a helical fashion. The wire 50 is electrically insulated with sheath or coating 51. The wire 50 is electrically connected to the bottom end of the resistance wire. In the preferred embodiment, the wires 50 and 51 fit snugly in the tubing to prevent the resistance wire from sliding within the tubing and causing contact between adjacent loops of the uninsulated resistance wire. The upper end of the resistance wire (not shown) is connected to an electrical lead in a manner similar to the connection between the ends of the resistance wire and leads in the heater illustrated in FIG. 1. Likewise the upper end of the tubing (not shown) is connected to a fitting. The bottom end of the tubing is sealed and closed off with a press lock type tube fitting 55 which has a shank portion 56. The wall of the shank has a series of parallel cicumferential ridges with outwardly extending sharp edges. The diameter of the ridges is greater than the ID (internal diameter) of the tubing. When the fitting is pushed into the bore of the tubing, the edges of the ridges cut into the inner wall of the tubing to form a fluid tight seal and lock the fitting into the tubing. No clamps are necessary with this type of fitting. In an alternative embodiment, the flexible resistance wire can be helically wound into a coil and positioned within the tube without a central lead wire support. If insulated resistance wire is employed, the wire can be closely wound with adjacent wire loops in contact. In these embodiments of the invention, the helical coil of wire helps support the wall of the tubing, and provide good heat transfer from the wire to the tubing wall.

Referring to FIG. 9, in this embodiment of the immersion heater, the flexible immersion heater element 16D includes the tubing 20, the plug fitting 55, insulated resistance wires 22A and 22B and a thermostatic switch 43. The switch is electrically connected to the respective bottom ends of the resistance wires by electrical leads 44A and 44B. The thermostatic switch completes the electrical circuit of the heater when the temperature of the fluid surrounding the element 16D reaches a predetermined temperature, such as the freezing temperature, and optionally breaks the circuit when the fluid reaches a second, higher, predetermined temperature. Optionally an insulative plug can be positioned between the ends of the wires 22A and 22B and the switch to prevent the switch from being actuated by the heat from the resistance wires. Alternatively, the switch can be utilized as a safety switch to break the heater's electrical circuit when the fluid temperature or the temperature of the resistance wire exceeds a critical temperature. For the later purpose, the switch can be positioned next to the resistance wires.

Optionally, the plug fitting can include a thermocouple element 45 as illustrated in FIG. 10. The thermocouple has insulated leads 46A and 46B which extend through the plug fitting, through the bore 20A of the tube 20 and through the bore 21A of the tube fitting 21 wherein they are connected to a recorder, read-out meter or the like (not shown). Alternatively, the thermocouple can be connected to a control system such as a thermostat control system for regulating the wattage input into the heater (not shown).

As described above, the immersion heater of the present invention is made of relatively few parts, all of which are readily available. The relatively simple construction of the present immersion heater permits the heaters to be built or manufactured on the job site. The present immersion heaters are prepared by cutting a length of tubing 20 to the desired length. If multi-bore tubing such as a two-bore tubing 32 illustrated in FIG. 4 is employed, the inner portions of the ends of the tubing are cut away to form chambers 34. A length of resistance wire 22 is cut to a length slightly less than twice the length of the tubing. Electrical leads 23 are connected to the ends of the resistance wire. The leads are passed through the central bore of the tube fitting 21 and sealed therein with sealant 25. This step can be done prior to connecting the resistance wire to the electrical lead. When multi-bore tubing is employed, the electrical resistance wire is threaded through the bores and chamber 34 prior to making electrical connection with the electrical leads. When employing a single bore tubing the electrical resistance wire 22 is folded upon itself and inserted into the central bore. If the space between the resistance wire and the end of the tubing is to be filled with a filler, the filler is generally inserted into the tubing at this stage of preparation. The end of the tube near the tube fitting is attached to the fitting and the other end of the tube is closed and sealed off with a tube fitting plug such as the screw-type follower plug or float-type plug or a heavy sink-type plug. Alternatively, the end of the tubing is sealed off with an adhesive or heat seal. The tube fitting then can be attached to a thread reduction fitting for insertion into a pipe line, conduit line or tank. The electrical leads can be connected directly to a male type plug or they can be connected to a control device such as 24B (see FIG. 1).

The resistance heater can be energized with a low voltage, high amperage current to minimize the danger of a hazardous electrical shock if the heater should short out. However the heaters can also be energized with household voltage of 115 or 220 volts or industrial voltage in the range of 440 or 660 volts.

In an alternative embodiment of the present invention (not shown) the immersion heater element can have two or more flexible resistance wires within the liquid impermeable fluid tubing. In another embodiment, the tube can contain a single length of resistance wire which runs the length of the tube. The tube will also contain a length of flexible insulated electrical lead which will be electrically connected to the free end of the resistance wire at the bottom of the tube. The upper end of the resistance wire is connected to a short length of electrical lead in the same manner as the ends of the resistance wire in heater 1 are connected to electrical leads as illustrated in FIG. 1. The flexible resistance wire is single or multistranded wire having a relatively high electrical resistance. A particular preferred type of resistance wire consists of a multistrand Fiberglas core around which is wound the resistance wire. The wire is insulated with an insulative coating of a Teflon brand polymer, polyvinyl chloride or a silicone polymer.

The flexible tubing employed in the present invention can be made of rubber, a polytetraflorethylene polymer, neoprene, polyethylene, or similar materials that are relatively inert, impermeable to liquids, flexible and relatively good electrical insulators. In situations where the heater element is exposed to high pressures, such as 200 psig, fiber, fabric or wire reinforced tubing is generally employed.

The tube fittings employed in the present invention can be conventional tube fittings, such as a serrated type illustrated in FIGS. 1 and 10 or the press lock type illustrated in FIGS. 8 and 9 or the sleeve lock type such as a Swage-Lok brand tube fittings. Similarly the tube fittings plugs can be the serrated type illustrated in FIG. 1 or the press lock type or the sleeve lock type.

Due in large part to the flexible and resilient nature of the present heaters, these heaters are able to withstand severe vibrations, pressure and shocks without breaking, shorting out or leaking. Frequently, conduit systems tend to chatter, rattle or undergo severe vibrations when fluid velocities and pressures cross critical thresholds. The vibrations are frequently severe enough to break or crack the pipes or pipe fittings. If the conduit system is being heated with tape type heaters, the breakage of the conduit pipes or fittings frequently tears the heater tape causing shorts and creating a great risk of harm and fire. When conventional immersion heaters are employed, vibrations in the system or the pressure of the liquid can cause the heaters to leak, break and/or short out. Such problems are overcome by the use of the present type of immersion heater.

The above detailed description of this invention is not intended to be a limitation thereof, and this invention contemplates other alternative embodiments within the scope and spirit of the invention. For example, a resistance heater having two or more flexible heating elements is contemplated within the scope of the present invention.

I claim as my invention:

1. In a flexible immersion heater, the combination of:
   a hose fitting having a nipple provided at one end with frustoconical annular ribs and means for connection to a support fitting;
   an elongated, liquid impermeable tube of a resilient non-metallic material and having one end telescoped over said annular ribs;

means sealing the other end of said tube, said means including a plug element having an adapter-type end portion having frusto-conical annular ribs, said end portion being inserted in said other tube end so as to seal the end of said tube;

an elongated, insulated, flexible electrical resistance wire within said tube and extending lengthwise thereof;

electrical leads extending through said hose fitting and respectively connected to the ends of said resistance wire; and sealant means in said hose fitting sealing said leads relative to said hose fitting.

2. The flexible immersion heater described in claim 1, further including a thermocouple element mounted in said plug element; two flexible, electrically insulated wires electrically connected to said thermocouple element and running the length of said tube and extending through said hose fitting.

* * * * *